United States Patent [19]

Borsani

[11] Patent Number: 4,840,023
[45] Date of Patent: Jun. 20, 1989

[54] FLEXIBLE CABLE GUIDE WITH TWO-DIRECTIONAL JOINTS

[75] Inventor: Paolo Borsani, Milan, Italy

[73] Assignee: Tecno S.p.A. Mobili e Forniture per Arredamento, Milan, Italy

[21] Appl. No.: 97,483

[22] Filed: Sep. 15, 1987

[30] Foreign Application Priority Data

Sep. 15, 1986 [IT] Italy ............................ 23021/86[U]

[51] Int. Cl.⁴ .............................................. F16L 3/14
[52] U.S. Cl. ...................... 59/78.1; 248/49; 248/51
[58] Field of Search ............... 59/78, 78.1; 248/49, 248/51, 68.1

[56] References Cited

U.S. PATENT DOCUMENTS

| | | | |
|---|---|---|---|
| 2,891,501 | 6/1959 | Rather | 59/78.1 |
| 3,282,044 | 11/1966 | Maisey | 59/78.1 |
| 4,186,553 | 2/1980 | Fitchett | 59/78.1 |
| 4,582,281 | 4/1986 | Van Camp | 248/49 |

FOREIGN PATENT DOCUMENTS 1585656  3/1981  United Kingdom ................ 59/78.1

Primary Examiner—David Jones
Attorney, Agent, or Firm—Herbert Dubno

[57] ABSTRACT

The flexible cable guide consists of a plurality of double-T shaped elements having curved flanges defining aligned cylindrical spaces, separated from one another by a central web of the shaped element, the elements being connected to each other by two-directional joints, a plurality of electrical supply, communications and the like cables being lodged in the cylindrical spaces defined by the curved flanges.

5 Claims, 4 Drawing Sheets

FLEXIBLE CABLE GUIDE WITH TWO-DIRECTIONAL JOINTS

BACKGROUND OF THE INVENTION

In furniture for offices, such as desks, work tables and the like, as well as in other furnishing items, there is a need for equipment of various types which require electrical supply and/or connections by means of electrical cables to other equipment physically remote from them. Examples of such items of equipment are telephone apparatuses, computers, calculating machines, illuminating equipment and so on, which are frequently present, often simultaneously, on desks and similar articles furniture. Frequently, therefore, there are large numbers of cables which must reach different zones of the furniture and which it is undesirable to allow to hang freely from the furniture itself, both for aesthetic and for safety reasons.

OBJECT OF THE INVENTION

It is, therefore, an object of the invention to provide a cable guide which will enable such cables to be housed in a single element, keeping them aligned and separate from one another, and which moreover can be arranged along the profile of the wall of the furniture by which the cable guide must be carried, following variations in direction.

SUMMARY OF THE INVENTION

This object is achieved with the present invention, which provides a flexible cable guide which is constituted of a plurality of shaped I-section members with curved flanges, defining aligned cylindrical spaces separated from one another by the central web of the shaped element, the elements being connected together by two-directional joints, i.e. joints having two mutually perpendicular pivot axes at each joint, it being possible for several electrical supply cables, communication cables and the like to be housed in the cylindrical spaces bounded by the curved flanges.

Each shaped element possesses, on each of its base surfaces, a pair of lugs projecting from the central web parallel to the axis of the element itself, spaced from one another and, adapted for receiving in articulated manner at the end a pair of pins of an articulation element. The articulation element is constituted of an annular body having two pairs of pins projecting radially in mutually perpendicular directions, the lugs of a contiguous shaped element, rotated through 90° with respect to the first, being capable of being connected to the second pair of pins of the articulation element, the pairs of lugs and the articulation element connected to them constituting the two-directional joint, of cardan type, for connecting together contiguous shaped elements.

The web of the shaped element possesses an axial hole, which, in the assembled position, is aligned with the central hole of the articulation element, permitting a stiffening cable to be inserted into said aligned holes.

In a median plane of the flanges of the shaped element, there is a groove having undercut re-entrant edges, into which groove shaped profiles for securing the cable guide to fixed members may be locked.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
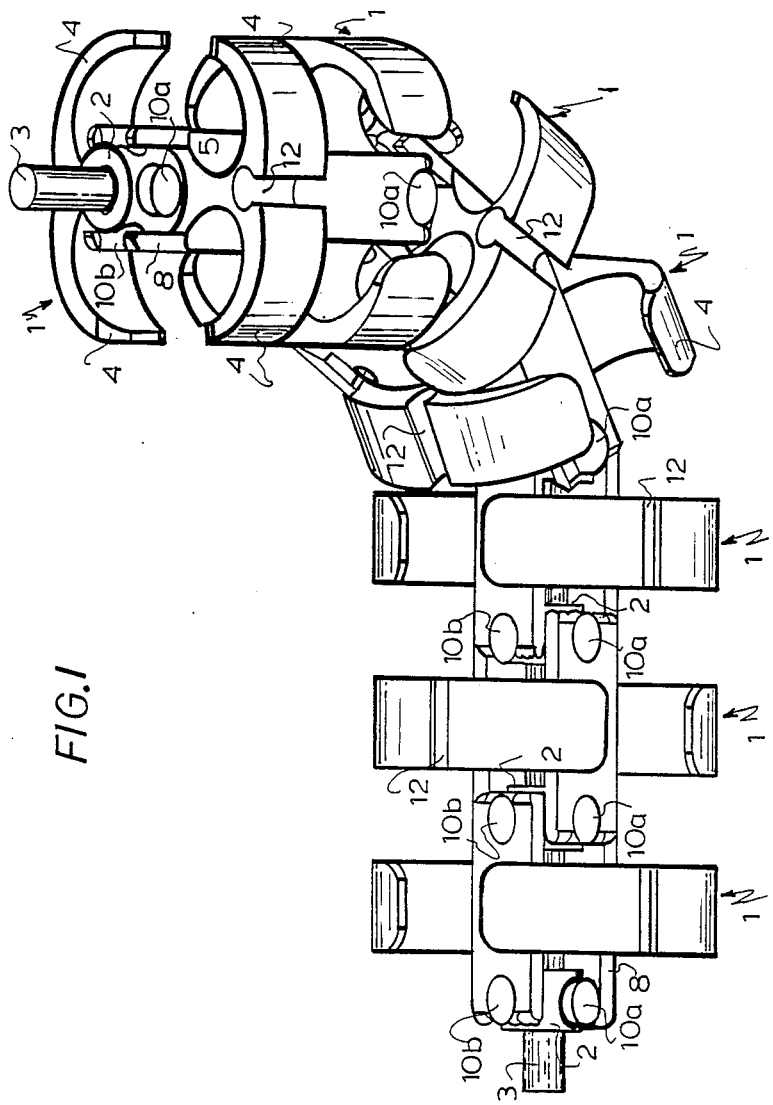
FIG. 1 is a perspective view of the cable guide according to this invention, in a curved layout.
Figure 2:
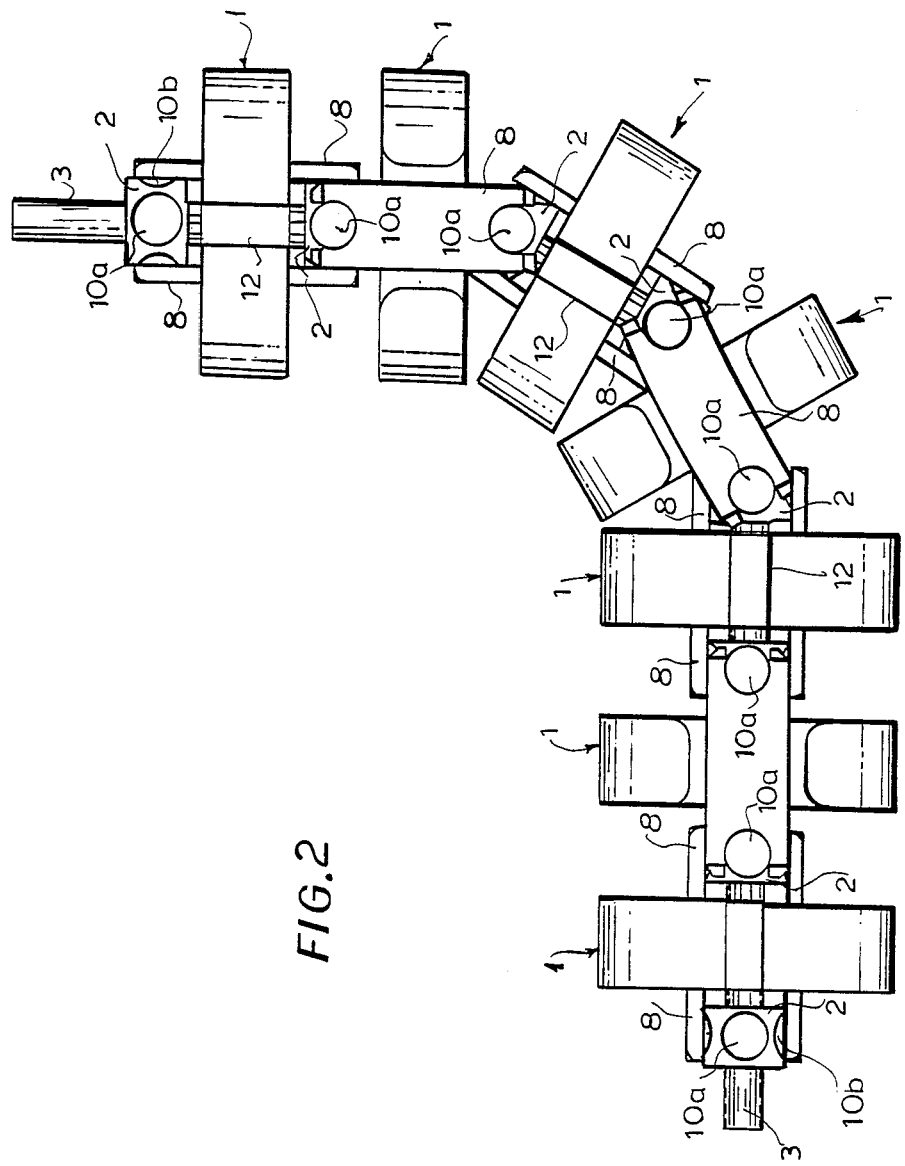
FIG. 2 is a side view of the cable guide of FIG. 1, curved in one direction.
Figure 3:
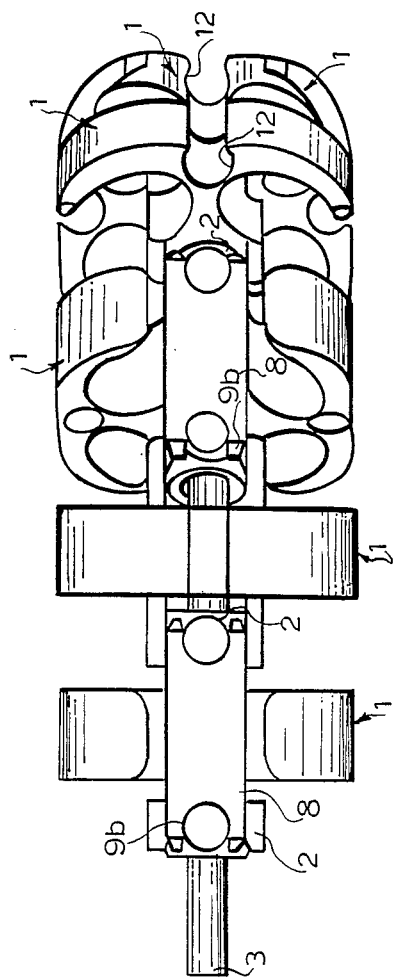
FIG. 3 is elevational view of the cable guide curved in a direction perpendicular to that of FIG. 2.

As FIGS. 1-3 show, the cable guide according to this invention is constituted of an articulated chain of shaped elements, which is flexible in every direction; the articulated elements possess seats for receiving and holding a plurality of electrical and signal cables in position, but separated in orderly manner.

Figure 7:
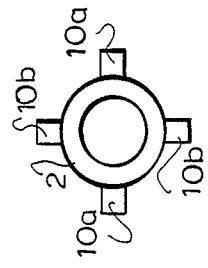
FIG. 7 is a front view of the articulation element of the cable guide in front view.
Figure 4:
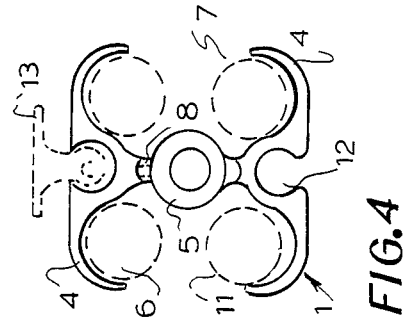
FIG. 4 is a front view of a shaped element of the cable guide.

In particular, the cable guide comprises a plurality of shaped elements 1, connected together by the interposition of an articulation element 2; both the articulated elements 1 and the articulation elements 2, as can be better seen from FIGS. 4 and 7, are axially traversed by holes and through these holes it is possible to insert a central guide cable 3.

Each element 1 is constituted of a substantially I-section body, in which the opposed flanges 4 are curved towards each other to form, in cooperation with the central web 5, four substantially cylindrical, defined spaces 6, intended for housing the cables and accessible from outside through the open zone 7.

Figure 6:
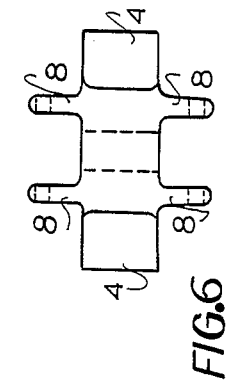
FIG. 6 is a side view of the element of FIG. 4 in a direction perpendicular to the first.
Figure 8:
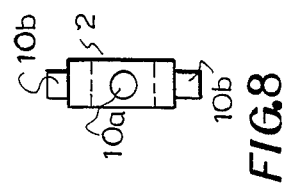
FIG. 8 is a side view of the articulation element.
Figure 5:
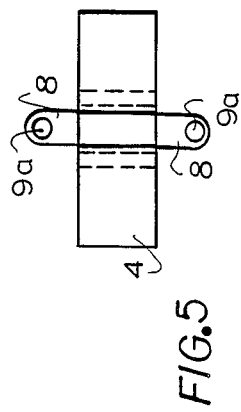
FIG. 5 is a side view of the element of FIG. 4, seen in one direction.

On the central web there are formed the projections 8, each formed at the end with a hole 9a, as shown in FIGS. 4 to 6 or, as illustrated in FIGS. 1 to 3, equipped with a fork 9b having re-entrant ends. Into the holes 9a or the forks 9b, the opposed radial pins 10a of the articulation element 2 are inserted in locked manner, the articulation element being composed of an annular member from which two pairs of mutually perpendicular pins, 10a and 10b, project radially outwards.

The pins 10b engage into the holes or forks of a following element 1, angularly offset through 90° with respect to the preceding one, thus forming a joint of the cardan type which enables the axes of the two consecutive shaped elements 1 to be oriented at an angle relative to each other in any plane. The cable guide according to this invention is therefore composed of a plurality of shaped elements and of articulation elements connected alternately, constituting a flexible structure adapted to be curved according to requirements, as illustrated in FIGS. 1, 2, and 3.

The spaced 6 of the consecutive shaped elements 1 are aligned with one another and therefore can each house one or more cables 11, indicated in broken lines in FIG. 4 which are separated from one another by the webs 5 of the successive shaped elements 1.

The insertion and removal of the cables 11 into and out of the cable guide is effected through the openings 7, utilizing the flexibility of the cables themselves and of the cable guide. It is also possible to lead out through the openings 7 branches of the cables to some apparatus connected to them, or to lead in new cables at an intermediate position in the cable guide.

With advantage, the flanges 4 of the shaped body 1 comprise the grooves 12, of substantially cylindrical form, having re-entrant external edges undercut in respect of the maximum width of the groove. In this groove, which, in the contiguous shaped elements rotated through 90° relative to each other, is aligned with the openings 7, shaped profiles 13 or the like may be inserted in locked manner, by means of which the cable guide may be secured to fixed structures, such as items of furniture, walls and the like, by adhesive, screws, locking-in or similar fixing means, depending upon the surface to which the profiles 13 are fixed.

I claim:

1. A flexible cable guide for a plurality of electrical conductors, comprising:

a plurality of generally I-shaped elements each formed with a central web provided with a throughgoing bore adapted to receive a stiffening cable, curved flanges defining laterally open generally cylindrical spaces adapted to receive respective electrical conductors, and respective pairs of mutually parallel spaced-apart lugs projecting axially from opposite sides of said central web; and annular articulation bodies interconnecting said elements in contiguous end-to-end articulated relationship, said articulation bodies each having two mutually perpendicular pairs of pins projecting radially, said lugs being provided with formations pivotally engageable with said pins, one of the pairs of pins of each articulation body being pivotally engaged with a pair of lugs of a respective one of said elements and the other pair of pins of each articulation body being pivotally engaged with a pair of lugs of a respective other of said elements angularly offset from said one of said elements through 90°, whereby each of said articulation bodies and the pairs of lugs pivotally connected thereto form a Cardan-type bidirectional joint, said joints spacing the flanges of successive ones of said elements apart so that conductors can pass into an out of said guide between said elements.

2. The flexible cable guide defined in claim 1 wherein said formations are forks formed on said lugs.

3. The flexible cable guide defined in claim 1 wherein said formations are forks holes in said lugs.

4. The flexible cable guide defined in claim 1, further comprising a stiffening cable passing through said bodies and said bores.

5. The flexible cable guide defined in claim 1 wherein said flanges are provided in a median plane of each of said elements with a respective groove having undercut edges for receiving profile members for attaching a cable guide to a support.

* * * * *